COHERENT FREQUENCY DIFFERENCE DETECTOR HAVING DIRECT-CURRENT OUTPUT INDEPENDENT OF MODULATION

Filed Sept. 14, 1962

INVENTORS
Walter F. Davison
John L. Ford
BY Moody and Antrim
Agents

United States Patent Office 3,160,815
Patented Dec. 8, 1964

3,160,815

COHERENT FREQUENCY DIFFERENCE DETECTOR HAVING DIRECT-CURRENT OUTPUT INDEPENDENT OF MODULATION

John L. Ford, Richardson, and Walter F. Davison, Dallas, Tex., assignors to Collins Radio Company, Cedar Rapids, Iowa, a corporation of Iowa Filed Sept. 14, 1962, Ser. No. 223,684
4 Claims. (Cl. 325—346)

This invention pertains to radio signal detectors of the type in which a frequency or phase-modulated signal is mixed with local oscillator signal and the resulting beat frequencies combined to provide a demodulated output signal, and particularly pertains to coherent frequency difference detectors that provide a direct-current output voltage proportional to deviation of the carrier frequency but independent of low-frequency modulation of the carrier.

For certain types of radio-receiving equipments, a discriminator comprising a pair of mixers with outputs connected to a phase detector operates satisfactory to produce control voltages. As shown in U.S. Patent 2,651,182 issued to R. Crane, Jr., on July 17, 1951, an incoming signal is applied to each of the mixers to be mixed with a locally generated signal that is applied to one mixer 90° out-of-phase with that applied to the other mixer. The output of the mixers is applied to a phase detector for providing an output voltage suitable for frequency control purposes.

However, in these circuits prior to the present invention the amplitude of the output of such a circuit is not always independent of frequency modulation. For those signals that are derived from a carrier modulated by a tone of single frequency, the output derived from the signal will be zero for certain indices of modulation according to the Bessel's function. The present circuit was developed to provide continuous direct-current control voltage for all degrees of modulation and for signal levels that are much below the average noise level. The circuit is suitable for controlling a local oscillator in a radio receiver that is used for tracking a transmitter that is on a moving vehicle. The frequency of the local oscillator of the receiver is correlated with the carrier frequency of the received signal regardless of low signal-to-noise ratio, degree of modulation, or the index of frequency modulation.

In the present system, the beat frequencies from the two mixers, to which the incoming signal and the quadrature local signals are applied, are not applied directly to a phase discriminator but are applied to differentiating circuits and to two additional mixers. Each of the additional mixers develops a beat frequency that is the product of the output of a respective one of the incoming mixers and the differentiated output of the other incoming mixer. The outputs of these additional mixers are applied to a subtracting circuit and a low-pass filter to develop a direct-current output voltage that is proportional to the amount of deviation from correlation of a local oscillator with the carrier frequency of the incoming signal, but independent of the degree of modulation.

An object of the invention is to demodulate a frequency-modulated signal to derive a control voltage proportional to the difference between a carrier frequency and a reference frequency independent of the degree of frequency modulation; and Another object is to provide a source of control voltage for correlating the frequency of locally generated signal reliably with the carrier of incoming frequency during periods of weak signal strength regardless of the degree of phase or frequency modulation.

The following description and the appended claims can be more readily understood with reference to the accompanying drawings in which:

Figure 1:
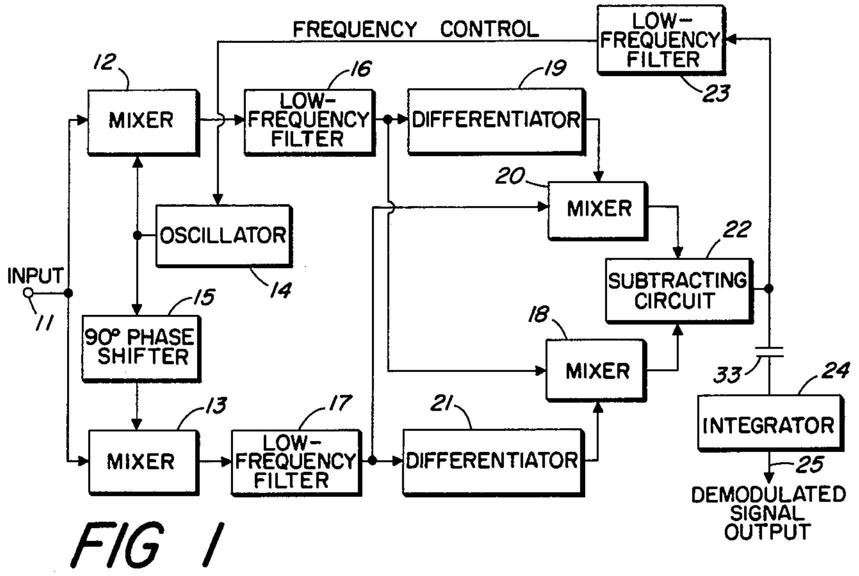
FIG. 1 is a block diagram of the circuit of this invention.

In FIG. 1, an input 11 to which phase or frequency modulated signal is to be applied is connected to one of the inputs of each of the mixers 12 and 13. The other input of mixer 12 is connected directly to the output of oscillator 14 and the other input of mixer 13 is connected through phase shifter 15 to the same output of oscillator 14. The phase shifter 15 provides a phase shift of 90° so that the beat-frequency components in the output of the mixer 12 differs in phase by 90° from that in the output of the mixer 13. The oscillator 14 may be a stable-fixed oscillator or may be one in which the frequency is stabilized by a control circuit as shown.

The outputs of mixers 12 and 13 are connected to the inputs of low-frequency filters 16 and 17 respectively. The low-frequency filters pass the low or difference beat frequency derived from the mixing of input signal and the local oscillator signal but rejects the carrier and higher or sum frequency components. The output of the filter 16 is connected directly to one input of the mixer 18 and through the differentiator 19 to one input of mixer 20. Likewise, the output of filter 17 is connected directly to the other input of the mixer 20 and is connected through differentiator 21 to the other input of the mixer 18.

The outputs of mixers 18 and 20 are connected to the subtracting circuit 22. As shown below, the output of the subtracting circuit 22 is essentially a direct-current component proportional to the difference between the frequency of the carrier applied to the input 11 and the frequency of the output of oscillator 14. A differential modulation component also present in the output of the subtracting circuit is readily removed by a low-frequency filter. The output of the subtracting circuit may be used for various control purposes. If desired, the output may be applied through a high-pass filter represented by capacitor 33 to integrator 24. The high-pass filter eliminates the direct-current component and the integrator operates upon the differential of the modulation component to recreate the transmitted modulating signal at output 25. According to FIG. 1, the output of the subtracting circuit is connected through a low-frequency filter 23 to the direct-current frequency control circuit of oscillator 14. The control circuit of oscillator 14 may be a usual variable reactance type circuit to change frequency of the oscillator. The output voltage from the subtracting circuit 22 is proportional to the difference in the frequencies of the input signal and the signal of oscillator 14 and has a polarity dependent upon which signal has the higher frequency.

Figure 2:
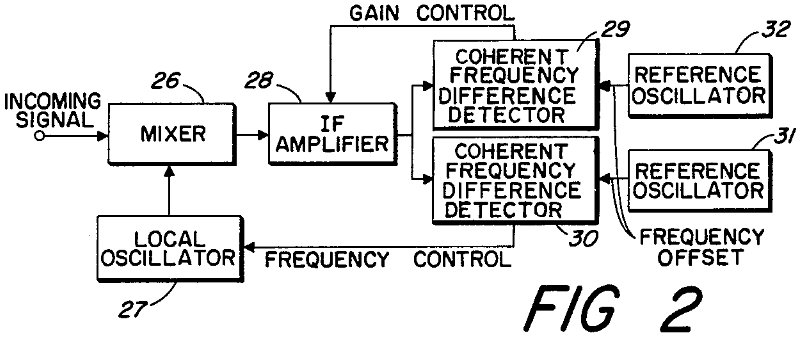
FIG. 2 is a block diagram of a preferred receiving circuit that utilizes circuits according to FIG. 1.

The application of the circuit of FIG. 1 to a receiving circuit is shown in FIG. 2. Each of the two blocks representing a coherent frequency detector include all the circuitry of FIG. 1 except the oscillator 14. Two reference oscillators are shown separately in FIG. 2 because the frequency of one oscillator is slightly offset from the frequency of the other. The mixer 26, local oscillator 27, and the intermediate-frequency amplifier stages 28 are conventional circuits connected in a usual superheterodyne receiving circuit. The local oscillator 27 has a frequency-control circuit of the usual reactance type for controlling frequency in response to the application of direct-current control voltage. The output of the intermediate-frequency amplifier 28 is connected to the inputs of both coherent frequency detectors 29 and 30. The output of coherent frequency detector 30 is utilized to control the frequency of the local oscillator 27 in the same manner that the output of the subtracting circuit 22 is utilized to control the frequency of oscillator 14 shown in FIG. 1. In the circuit as shown in FIG. 2, the reference oscillator 31, which supplies local signal corresponding to that generated by oscillator 14 in FIG. 1 for application of the input mixers, may be a stable fixed frequency oscillator. When the intermediate-frequency signal that is applied from the intermediate-frequency amplifier 28 to the frequency detector 30 departs from the frequency of the reference oscillator 31, control voltage of the proper polarity is developed by the frequency detector 30 for application to the frequency control circuit of oscillator 27 to change the intermediate frequency as required for substantially eliminating difference between the intermediate frequency and the frequency of the reference oscillator. The direct-current voltage output of the frequency detector 29 is connected to the usual gain-control circuit of the intermediate-frequency amplifier 28. The frequency of oscillation of the reference oscillator 32 differs from that of the reference oscillator 31 to the small extent required for obtaining a constant direct-current control voltage from the output of the frequency detector 29 at all times regardless of zero output of the frequency detector 30. Therefore, when the output of frequency detector 30 is zero and the intermediate frequency is at the desired frequency for correlation with an incoming signal, gain control voltage derived from the frequency detector 29 changes in the required direction for changing the sensitivity of the intermediate frequency amplifier 28 inversely with the strength of the incoming signal.

Figure 3:
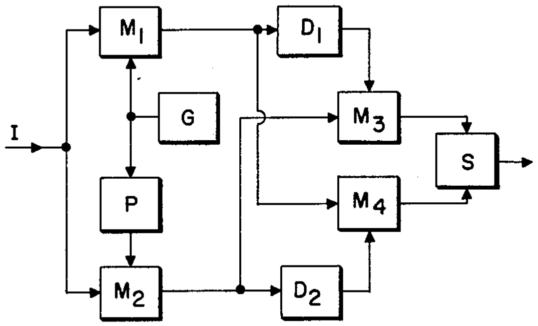
FIGURE 3 is another block diagram corresponding to the circuit of FIGURE 1.

In FIG. 3, letters have been assigned to the various functions of the blocks of FIG. 1 to facilitate mathematical derivation of the output of subtracting circuit S as a function of the phase modulated input signal I and of the local generated signal G. Each of the blocks representing mixing functions in FIG. 3 also include low-pass filters for passing the low-frequency or difference component of its output beat frequency while rejecting the carrier and sum frequencies.

The phase modulated input signal I may be represented as $$I=K\cos[\omega t+f(t)]$$

or letting $\omega t+f(t)=A$, $$I=K\cos A$$

where $\omega=2\pi f$,
$f$=the carrier frequency,
$t$=time,
$f(t)$=a phase modulated component, and
$K$=a constant dependent upon amplitude of the carrier.

The output of oscillator G for application to $M_1$ is $$G=K_0\cos(\omega t+\phi)$$

or letting $\omega' t+\phi=B$, $$G=K_0\cos B$$

where $\omega'=2\pi f'$,
$f'$=the frequency of the output G, and
$\phi$=arbitrary phase of G when $t$ is zero.

The output $M_1$ of one of the incoming mixers is $$M_1=I\cdot G=K_0K\cos A\cos B=\frac{K_0K}{2}[\cos(A+B)+\cos(A-B)]$$

Assuming that the mixer $M_1$ passes only frequencies $M_1'$ below the fundamental components, its output is $$M_1'=\frac{K_0K}{2}\cos(A-B)=\frac{K_0K}{2}\cos[(\omega-\omega')t-\phi+f(t)]$$

The output P of the phase shifter is 90° out of phase with the output G so that $$P=K_0\sin(\omega' t+\phi)=K_0\sin B$$

and the output $M_2$ of the other incoming mixer is $$M_2=P\cdot I=K_0K\cos A\sin B=\frac{K_0K}{2}[\sin(A+B)-\sin(A-B)]$$

The low-frequency component $M_2'$ of $M_2$ is $$M_2'=\frac{-K_0K}{2}\sin(A-B)$$

The differential $D_1$ of $M_1'$ is $$D_1=d/dtM_1'=d/dt\frac{K_0K}{2}\cos(A-B)=\frac{-K_0K}{2}\sin(A-B)d/dt(A-B)=\frac{-K_0K}{2}[\sin(A-B)][\omega-\omega'+df/dt(t)]$$

The outputs $D_1$ $M_2'$ are mixed to provide $$M_3=D_1M_2'=\frac{K_0^2K^2}{4}[\sin^2(A-B)][\omega-\omega'+df/dt(t)]$$

Differentiating the output of $M_2$ $$D_2=d/dtM_2'=d/dt\frac{-K_0K_2\sin(A-B)}{2}=\frac{-K_0K}{2}\cos(A-B)d/dt(A-B)=\frac{K_0K}{2}[\cos(A-B)][\omega-\omega'+df/dt(t)]$$

The outputs $D_2$ $M_1'$ are mixed to provide $$M_4=D_2M_1'=\frac{-K_0^2K^2}{4}[\cos^2(A-B)][\omega-\omega'+df/dt(t)]$$

By subtracting $M_4$ from $M_3$ in the subtracting circuit S, only a direct-current component and the differential of a modulation component remain.

$$S=M_3-M_4=\frac{K_0^2K^2}{4}[\omega-\omega'+df/dt(t)]$$

When the modulation term $df/dt$ is removed by a low pass filter F and the direct-current output $$\frac{K_0^2K^2}{4}(\omega-\omega')$$

is fed back to control the oscillator with a base frequency $\omega_0$ and sensitivity $k_0$, the radian frequency $\omega'$ of the oscillator is $$\omega'=\omega_0+k_0F=\omega_0+\frac{k_0K_0^2K^2(\omega-\omega')}{4}$$

and $\omega'$ in terms of $\omega$ and $\omega_0$ is $$\omega'=\frac{\omega_0}{1+t}+\frac{t}{1+t}\omega$$

where $$t=\frac{k_0K_0^2K^2}{4}$$

When the feedback frequency control or servo loop has high gain so that $t$ approaches infinity, the loop follows the carrier frequency $f$ so that $f'=f$. As shown in the equation, the frequency control of G is independent of modulation. When the output of the subtracting circuit 22 of FIG. 1 is applied through a high-pass filter 33 to the integrator 24 so that the operation on the output is inverse to that for controlling oscillator 14, a demodulaed signal is obtained.

The coherent frequency difference detector of this invention has been shown in FIG. 2 as applied to a tracking receiver. The output of the receiver is used for training an antenna so that the antenna is properly oriented for receiving maximum desired signal continuously even though the signal has variable high-degrees of modulation and at times is so weak at the receiver that the intelligence cannot be derived. The coherent frequency difference detector may be modified in ways obvious to those skilled in the art for various receiving and controlling functions and still be within the spirit and scope of the following claims.

What is claimed is:

1. A coherent frequency difference detector circuit comprising, a signal input circuit for receiving frequency-modulated signal, a source of reference frequency for developing first and second reference signals differing in phase by 90 degrees, means for mixing said input signal with said first and with said second reference signals separately to develop first and second beat frequencies respectively, first and second differentiating means for differentiating said first and second beat frequencies respectively, means for mixing said first beat frequency and said differentiated second beat frequency to develop a third beat frequency, means for mixing said second beat frequency and said differentiated first beat frequency to develop a fourth beat frequency, and subtracting means having an output circuit for subtracting said third and fourth beat frequencies and for filtering the difference thereof to produce in said output circuit a direct-current output control votlage having an amplitude dependent upon the frequencies of the carrier of the signal applied to said input relative to the frequency of said source but independent of the frequency modulation of said carrier.

2. A coherent frequency difference detector circuit according to claim 1 in which said source of reference frequency is a local oscillator having a frequency controlling circuit, and said output circuit is connected to said frequency controlling circuit.

3. In a coherent frequency difference detector, first, second, third and fourth mixers, each having two inputs and an output, a signal input circuit connected to an input of each of said first and second mixers, an oscillator, a quadrature phase shifter, said oscillator being connected directly to the other input of said first mixer and through said phase shifter to the other input of said second mixer, first and second differentiators, the output of said first mixer being connected directly to an input of said fourth mixer and connected through said first differentiator to an input of said third mixer, the output of said second mixer being connected directly to the other input of said third mixer and connected through said second differentiator to the other input of said fourth mixer, a subtracting circuit having first and second inputs and an output the output of each of said third and fourth mixers being connected to a respective one of said inputs of said subtracting circuit, said subtracting circuit developing in its output a voltage that is the difference between the outputs of said third and fourth mixers, a direct-current control voltage output circuit, a low-pass filter, and the output of said subtracting circuit being connected through said filter to said direct-current voltage control circuit.

4. A coherent frequency difference detector according to claim 3 in which said oscillator has a control circuit responsive to application of direct-current voltage for controlling its frequency, and said direct-current voltage control output circuit being connected to said control circuit of said oscillator.

No references cited.